(12) United States Patent
Jones et al.

(10) Patent No.: US 8,996,815 B2
(45) Date of Patent: Mar. 31, 2015

(54) CACHE MEMORY CONTROLLER

(75) Inventors: Andrew Michael Jones, Bristol (GB); Stuart Ryan, Bristol (GB)

(73) Assignee: STMicroelectronics (Research & Development) Limited, Marlow Bucks (GB)

(*) Notice: Subject to any disclaimer, the term of this patent is extended or adjusted under 35 U.S.C. 154(b) by 263 days.

(21) Appl. No.: 13/560,491

(22) Filed: Jul. 27, 2012

(65) Prior Publication Data

US 2013/0031312 A1 Jan. 31, 2013

(30) Foreign Application Priority Data

Jul. 28, 2011 (GB) .................................. 1112973.1

(51) Int. Cl.
*G06F 12/00* (2006.01)
*G06F 12/08* (2006.01)

(52) U.S. Cl.
CPC ........ *G06F 12/0862* (2013.01); *G06F 12/0802* (2013.01); *G06F 2212/6022* (2013.01); *G06F 2212/6028* (2013.01)
USPC ............ 711/137; 711/118; 711/151; 711/158

(58) Field of Classification Search
CPC ............ G06F 12/0862; G06F 12/0802; G06F 2212/6022; G06F 2212/6028
See application file for complete search history.

(56) References Cited

U.S. PATENT DOCUMENTS

| 7,430,650 | B1 | 9/2008 | Ross | |
|---|---|---|---|---|
| 2003/0105937 | A1* | 6/2003 | Cooksey et al. | 711/203 |
| 2006/0095677 | A1 | 5/2006 | Hakura et al. | |
| 2009/0198907 | A1 | 8/2009 | Speight et al. | |
| 2010/0211745 | A1* | 8/2010 | Jeddeloh | 711/137 |

FOREIGN PATENT DOCUMENTS

EP 1217526 A1 6/2002

OTHER PUBLICATIONS

Great Britain Search Report dated Nov. 16, 2011 from corresponding Great Britain Application No. 1112973.1.

* cited by examiner

*Primary Examiner* — Shawn X Gu
(74) *Attorney, Agent, or Firm* — Allen, Dyer, Doppelt, Milbrath & Gilchrist, P.A.

(57) ABSTRACT

An integrated circuit (IC) may include a cache memory, and a cache memory controller coupled to the cache memory. The cache memory controller may be configured to receive a cache miss associated with a memory location, issue pre-fetch requests, each pre-fetch request having a quality of service (QoS), and determine if a pre-fetch request has issued for the memory location associated with the cache miss.

33 Claims, 5 Drawing Sheets

| A | PREFETCH ADDRESS | PREFETCH TID | PREFETCH QoS | P | M | MISS TID |
|---|---|---|---|---|---|---|
|   |   |   |   |   |   |   |
|   |   |   |   |   |   |   |
|   |   |   |   |   |   |   |

CACHE MEMORY CONTROLLER

CROSS REFERENCE TO RELATED APPLICATIONS

This application claims the priority benefit of Great Britain patent application number 1112973.1 filed on Jul. 28, 2011, which is hereby incorporated by reference to the maximum extent allowable by law.

BACKGROUND

1. Technical Field

The present disclosure relates to a cache memory controller.

2. Discussion of the Related Art

Data caching is a technique which exploits a property of data access known as temporal locality. Temporal locality means that data that has been accessed recently is the data most likely to be accessed again in the near future. Data caching involves storing or caching a copy of recently accessed data in a cache memory that is accessible more quickly and efficiently than the primary memory from which the data was originally obtained. If the same data is requested again in the future, the cached copy of the data can be retrieved from the cache memory rather than retrieving the original data from the primary memory. As the cache memory can be accessed more quickly than the primary memory, this can increase the overall speed of data retrieval.

Spatial locality may also be exploited by data caching. This is the property that data stored in a memory location close to a previously requested address is likely to be used.

Some systems employ a technique known as data pre-fetching in which data may be retrieved, possibly speculatively, before it is actually needed in order to increase the overall speed of memory access. Data pre-fetches may be regarded as being speculative in the sense that the pre-fetched data may not eventually be required. Pre-fetching may allow the cache to extend the range of the spatial locality being exploited beyond the intrinsic size of the cache line.

The pre-fetched data is stored in the cache and is treated as cached data. In this way, when the pre-fetched data is actually requested, the cache will be checked to determine whether the requested data is located there.

In some systems, an interconnect may be provided between the cache memory and the primary memory. If the interconnect is limited or shared with the number of resources, pre-fetch requests may contribute to latency to this interconnect. This may result in the latency in the overall system being increased.

SUMMARY

According to a first aspect, there is provided a cache memory controller comprising: a pre-fetch requester configured to issue pre-fetch requests, each pre-fetch request having one of a plurality of different quality of services.

According to a second aspect, there is provided a method comprising: issuing pre-fetch requests, each pre-fetch request having one of a plurality of different quality of services.

BRIEF DESCRIPTION OF THE DRAWINGS

For a better understanding of some embodiments, reference will now be made by way of example only to the accompanying figures which show:

FIG. 6 schematically shows a pre-fetch table of the pre-fetch register of FIG. 2.

DETAILED DESCRIPTION

Figure 1:
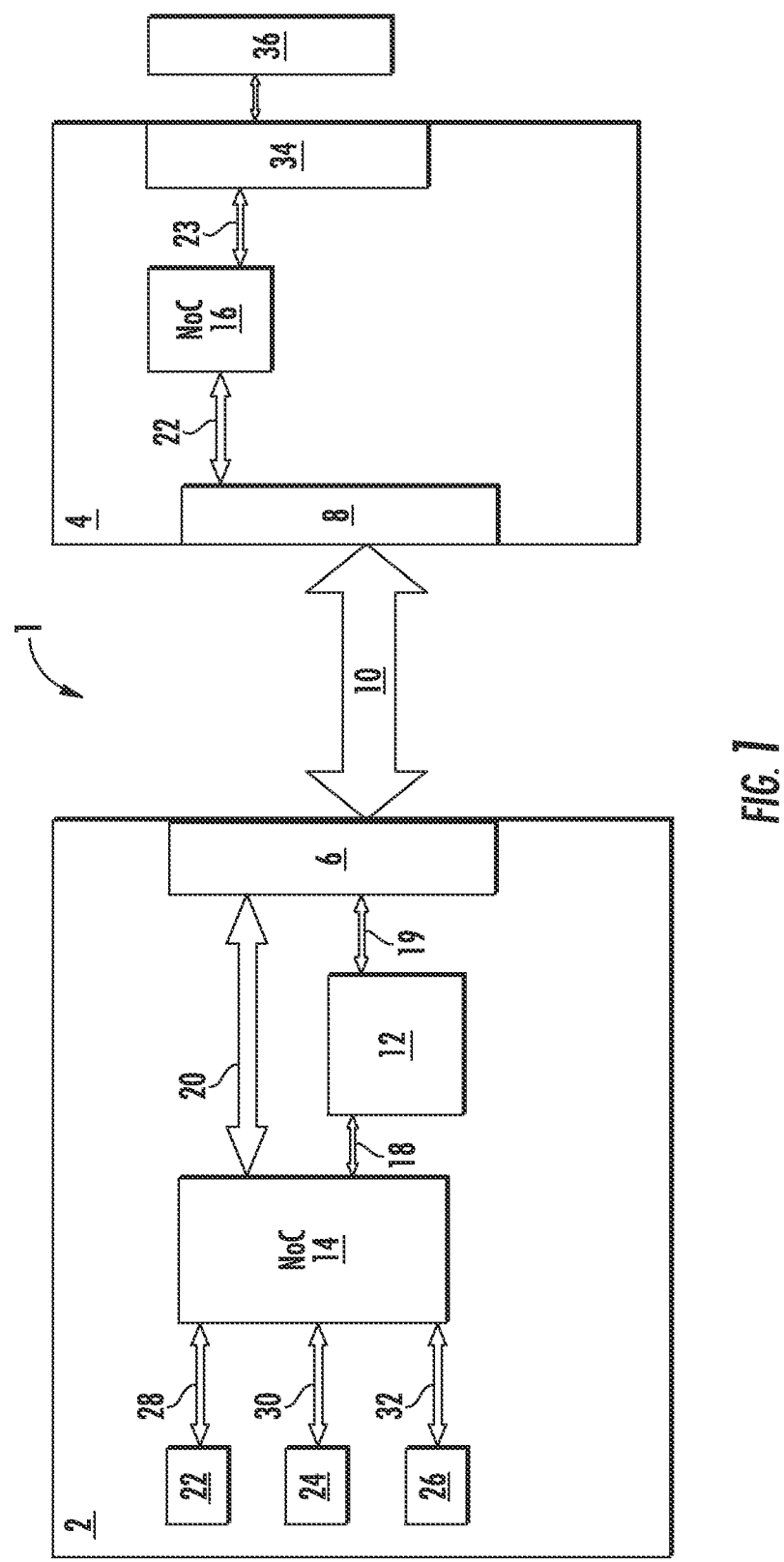
FIG. 1 shows an example of a system in which embodiments may be used.

Some embodiments may be used where there are more than one die within a single package. In particular, a plurality of integrated circuit dies may be incorporated within a single package. In the following examples, a single package having two dies is described. However it is appreciated that this is by way of example only and more than two dies may be provided in some embodiments in the same single package.

For example, the decreasing feature size in CMOS silicon processes allows digital logic to shrink significantly in successive fabrication technology. For example, an area reduction of 55% may be obtained when comparing a digital logic cell implemented in 90 nanometer technology with a digital logic cell implemented in 65 nanometer technology. However, analog and input/output cells tend to shrink much less if at all in these implementations. This may lead to increasingly pad limited designs in many complex system-on-chips (SoC). A pad limited design can be considered wasteful if the digital logic is not implemented as densely as it might be if it were the determining factor in the device area.

Another factor in some embodiments is that the transition, for example, to a sub 32 nanometer design may introduce a dichotomy between supporting low voltage, high speed input/output logic such as DDR3 (Double Data Rate) RAM (Random Access Memory) 1.5 V @ 800 MHz or higher on the one hand and higher voltage interconnect technologies, for example HDMI (High Definition Multimedia Interface), SATA (Serial Advanced Technology Attachment), USB3 (Universal Serial Bus), etc. The lower voltage DDR3 interface may require a lower transistor gate oxide thickness as compared to the HDMI technology. This may be incompatible within a standard process.

Porting of high speed analog interfaces to a new process consumes a lot of resources in terms of time and expert attention. By decoupling the implementation of analog blocks from that of digital blocks of the system may allow a reduction in time to working silicon.

By splitting a traditional monolithic system-on-chip into a plurality of dies in order to form a system in package comprising two or more dies, advantages can be achieved. For example, each die may be designed to provide a particular function which may require various different mixes of analog and digital circuitry in the implementation of the particular function. This means that in some embodiments, it may be possible to use the same die or same design for a die in different packages. This modularity may reduce design time.

Embodiments may be used where there are two or more dies in the package. Embodiments may be used where the dies are manufactured in different technologies. Embodiments may be used alternatively or additionally where it is advantageous for at least one of the dies to be certified, validated or tested independently for conformance to, for example, a standard. Embodiments may alternatively or additionally be used where one of the dies contains special purpose logic to drives specific wireless, optical or electrical interfaces so that the other die or dies can be manufactured independently and not incur any costs associated with the special purpose logic. Embodiments may alternatively or additionally be used where one of the dies contains information, for example encryption information, which is to be withheld from the designers/manufacturers of the other die or dies. Embodiments may alternatively or additionally be used where one of the dies contains high density RAM (Random Access Memory) or ROM (Read Only Memory) and it is preferable to separate this from standard high speed logic for reasons of fabrication yield and/or product flexibility.

It should be appreciated that some embodiments may have additional or alternative advantages other than those discussed previously.

Reference is made to FIG. 1 which schematically shows a system in package 1 having a first die 2 and a second die 4.

The first die 2 comprises three initiators 22, 24 and 26. These initiators are configured to issue requests. By way of example only, these requests may comprise memory transactions for a memory 36 associated with the second die 4. Each initiator is arranged to have a respective communication path 28, 30 and 32 with a network-on-chip 14. By way of example only, the communication paths 28, 30 and 32 may comprise a respective interconnect. The paths may be bidirectional. The paths allow the initiator to issue requests and to receive responses to those requests. The network-on-chip will route the requests to the correct destination as well as the responses to the requests. As is schematically shown in FIG. 1, the network-on-chip 14 is connected via a communication path 18 to a cache arrangement 12. This will be described in more detail later. The network-on-chip 14 is connected to an interface 6 via a communication path 20. The communication paths 18 and 20 may be interconnects. The communication paths 20 may bidirectional as may communication path 18.

A communication path 19 is provided between the cache arrangement 12 and the interconnect 6. The communication path may be bidirectional. The communication path 19 may be an interconnect. This will be described in more detail in relation to FIG. 2.

The interface 6 interfaces with an interconnect 10. The interconnect 10 may have a plurality of connections which allow the interface 6 to send and receive communications to and from the interface 8 of the second die 4.

The second die 4 has a network-on-chip 16 and a memory interface 34. The network-on-chip 16 is arranged to communicate with the interface 8 via communication path 22 and with the memory interface 34 via communication path 23. One or both of these communication paths may be am interconnect. One or both of these communication paths may be bidirectional. The memory interface 34 is arranged to interface with a memory 36. As shown in the arrangement of FIG. 1, this memory 36 is outside the second die 4. However, it should be appreciated that in some embodiments, the memory may be at least partially provided in the second die 4.

In the arrangement shown in FIG. 1, memory mapped transactions are issued from an initiator, for example one of the initiators 22, 24 or 26. The transactions issued by the initiator may include address information which is used by the network-on-chip to route the transactions. On the second die 4, the transaction may be received and routed to a destination dependent on the address information. In the case of the memory transaction, the transaction will be routed to the interface so that the memory can be written to or read from, as required. In some embodiments, communication from between the two dies will be read and write transactions to memory address space associated with respective dies.

In order to simplify the explanation of some embodiments, the following will assume that the initiator on the first die will read and write transactions to the memory 36 associated with the second die. However, it should be appreciated that in practice, the relationship between the two dies may be more complex and so, for example, the second die may also have initiators which may want to communicate with a memory which is either accessed via the first die or part of the first die.

In some embodiments, the memory transactions may be carried by sequence of packets over the interface between the two dies. However, it should be appreciated that the memory transactions can be transferred across the interface in any other suitable way.

In some embodiments, a cache arrangement may be provided on the first die. The cache arrangement may support pre-fetching. Data pre-fetching is where a prediction is made as to what data will be required and that data is retrieved, possibly speculatively. This may be based, for example, on one or more addresses from which data has actually be retrieved. In one embodiment, addresses adjacent to an address from which data has actually been retrieved may be candidates for a pre-fetch.

In arrangements such as shown in FIG. 1, the interface between the dies provided by the interface 6 on the first die and the interface 8 on the second die and the interconnect 10 there between provide a transparent mechanism for an initiator on one die, for example initiator 22, 24 or 26 on the first die to access system memory space located or associated with another die, in this case the second die 4 and the memory 36.

The physical connection of interconnect 10 between the two interfaces is relatively narrow and has to carry traffic from various sources. Accordingly, accessing a memory on a different die or associated with a different die may have a greater latency than accessing a memory location which maps to the same die as the requesting initiator. An increase in memory latency may lead to a decrease in effective CPU performance as the processor (initiator) may need to stall until a response to a memory request is received. In order to reduce the latency seen by the initiators making memory requests to a different die, a cache arrangement 12 is provided on the die which has the initiator(s).

Consider the case of where there is a miss on the cache. A cache miss is where the required data is not stored in the cache and the data needs to be read from the memory. If there is a miss on the cache, there is a latency cost required for accessing the memory. One technique for reducing the likelihood of a miss is to implement pre-fetch as discussed previously. The pre-fetch mechanism can be controlled in any suitable way through, for example, explicit software commands or autonomously by the cache controller itself.

Traditionally every transaction crossing the interconnect 10 contributes to "head of line blocking". That is, transactions which follow a particular transaction wait for transactions ahead of it in some logical queue before it can cross from one die to another. A heavily loaded shared link could in some circumstances collapse and the latencies seen by all users of the link may increase considerably.

The pre-fetch requests issued by the cache arrangement may contribute additional latency to the interconnect 10. It may be that this pre-fetched data is not used, thus not reducing the cache miss rate. This may occur where the data pre-fetched is not used by the CPU before that data is evicted from the cache.

Figure 2:
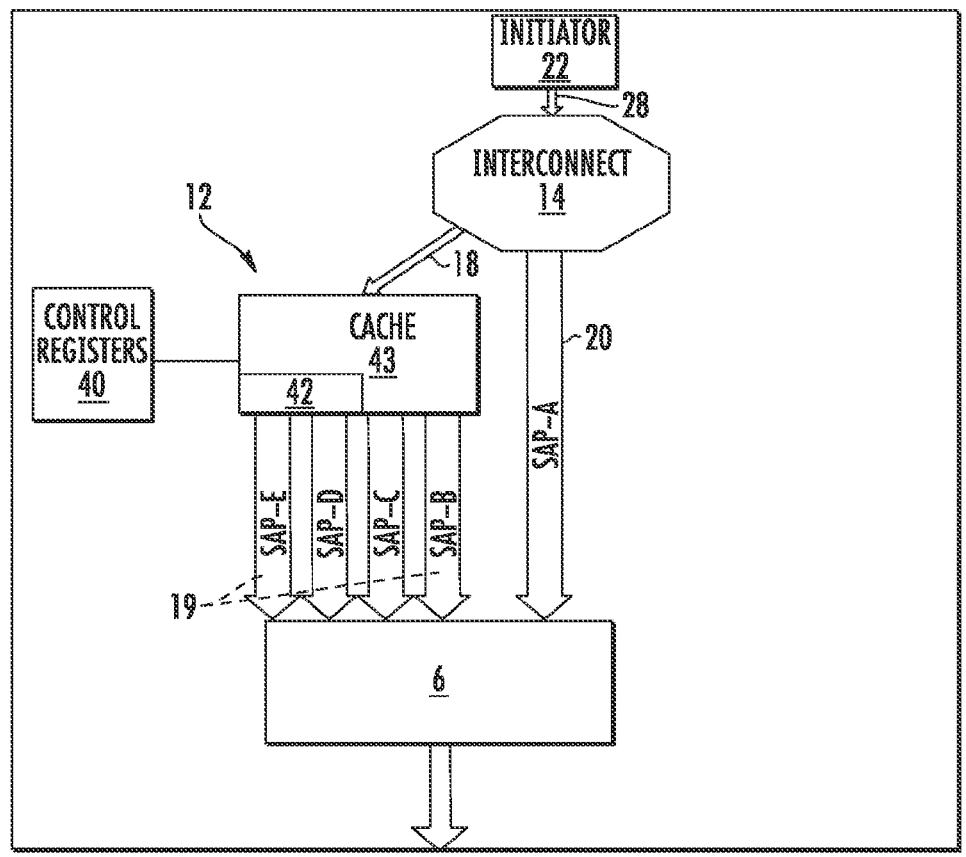
FIG. 2 shows one die of FIG. 1 in more detail.

FIG. 2 shows part of the first die in more detail. For simplicity, a single initiator 22 is shown. The initiator 22 issues a memory request. That request is received by the cache arrangement 12 via the communication path 28, the network-on-chip 14 and the communication path 18. Based on memory address information in the memory request, a look-up operation is performed to see if the data associated with that memory location is stored in the cache. If that data is stored in the cache, this is a hit and the cached data is returned as a response to the initiator via the same path as the request.

If the data associated with the address in the request is not stored in the cache, then this is a miss and the memory request needs to send to the second die in order to retrieve the required data.

In alternative embodiments, the memory could be one or other die or accessed via the first die.

In some embodiments, at least some of the memory requests of an initiator are provided with a quality of service. The quality of service may be derived from the identity of the initiator, determined from information included within the request or by any other suitable method.

The cache arrangement 12 comprises a cache memory 43 and pre-fetch buffers which issues pre-fetch requests. The pre-fetch buffer is controlled by a control register 40.

Reference is now made to FIG. 6 which shows a pre-fetch table which is provided in the pre-fetch buffers 42. This table has the following information: For each entry in the table, a flag is set as to whether or not the entry is active or not. For each entry, the pre-fetch address is stored. If the transaction is a pre-fetch, the pre-fetch transaction identity TID is stored. The pre-fetch quality of service is stored. This is the quality of service with which a pre-fetch request is issued. This is described in more detail later.

The table also has a miss TID. The miss TID is stored in the table if there is already a pre-fetch transaction outstanding with the same address. A pre-fetch flag will be set if a request has been sent as a result of a pre-fetch request. Similarly, the miss flag will be set if the request has been sent by the cache arrangement as a result of a cache miss. This will be described in more detail later.

In the example shown in FIG. 2, the control register 40 which is configured to control the cache arrangement 12 has information about the quality of service associated with each requestor. The output of the cache arrangement 12 is provided to one of four queues. These are referenced 19. In this embodiment, each of these queues is provided with a different quality of service. For example, the first queue 19 may have the highest quality of service requirement whilst the last queue 19 may have the lowest quality of service.

It should be appreciated that in other embodiments, more or less than four queues may be provided. In some embodiments, each queue is provided with a different quality of service. In some embodiments, at least one queue may be provided with same quality of service as at least one other queue, which would be different to the quality of service provided by at least one other queue.

In the case of a cache miss, the request from the initiator is put into one of the queues. This will be determined by the quality of the service associated with the request and/or the initiator. In other words, the control register 40 will ensure that the request from the initiator will be put into the queue with appropriate quality of service appropriate. The request will then be sent to the second die and the data requested by that transaction will be returned to the initiator and stored in the cache memory 43.

Figure 7:
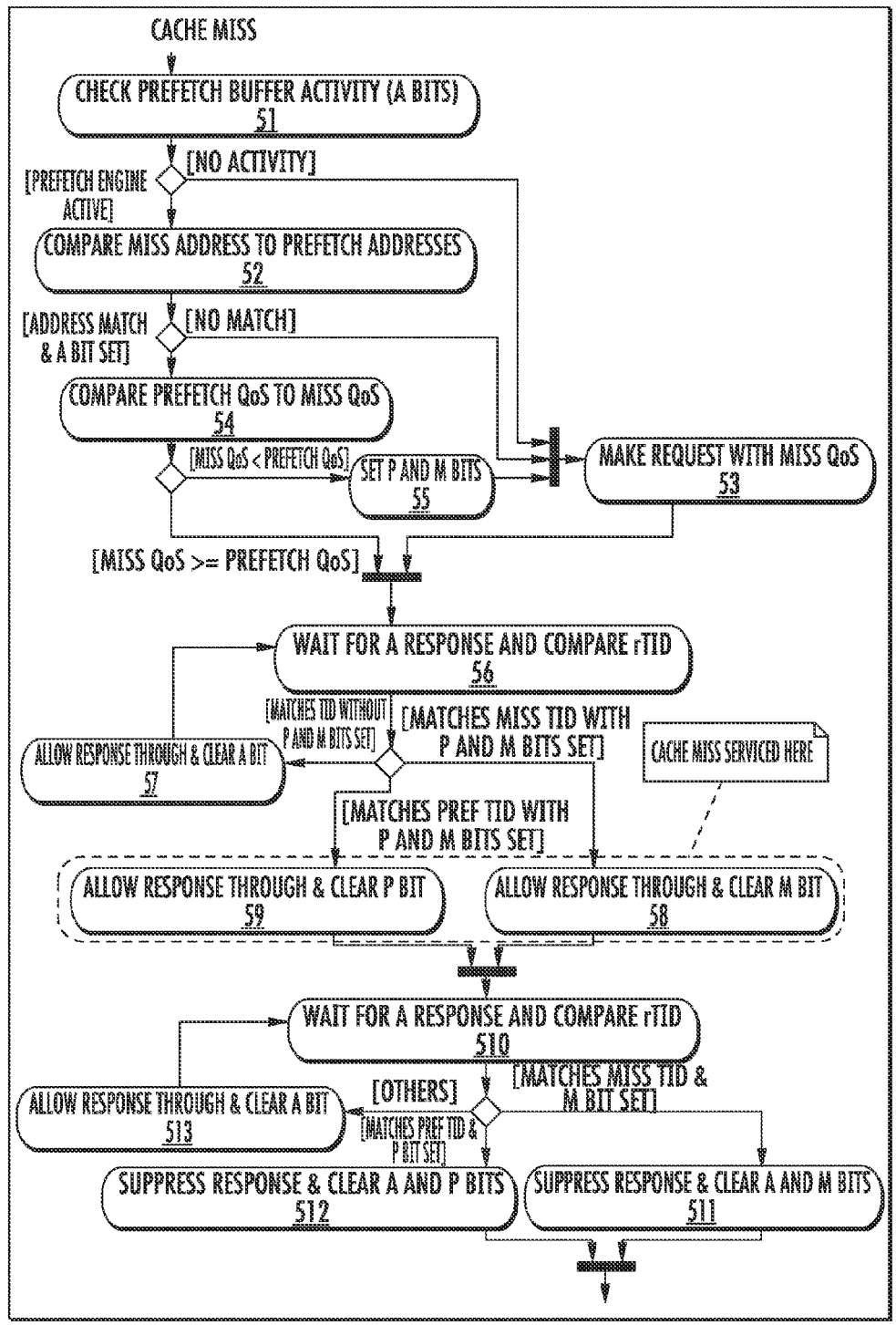
FIG. 7 schematically shows a flow for a miss.

Reference is now made to FIG. 7 which describes the process when a cache miss is determined. As will now be described, this process is used to detect race conditions appearing during miss and pre-fetch operations. While a pre-fetch is in flight, there is a chance that the initiator generates a miss to an address covered by an outstanding pre-fetch. There is a chance that a request from the cache, where the quality of service level of the originator requester is higher than the pre-fetch request, could get access to the interconnect before the pre-fetch request does. Thus, in embodiments, where a miss occurs where a pre-fetch for the same address is in flight, the cache will generate a request with the quality of service level of the original requester. The cache will keep track of the transaction credentials, for example the TID of both the pre-fetch and the request generated by the miss. The cache will use the data from whichever transaction is returned on the second die first and will drop the response that arrives second.

The process shown in FIG. 7 may be carried out at least partly by at least one executable instruction of a computer program which when run performs at least one of the steps of FIG. 7. The computer program may be stored in at least one memory and the computer program may run on at least one processor. Some embodiments may be implemented in hardware. Other embodiments may be implemented by hardware and software.

In step S1, a check is made of the pre-fetch buffer activity. The pre-fetch buffer is as shown in FIG. 6 and is as previously described. In particular, a check is made to see whether or not there are any active entries in the table.

If there are no active entries in the pre-fetch buffer table, the next step will be step S3 where the request is presented to the queue corresponding to the quality of service associated with the miss request.

If there are any active entries in the pre-fetch buffer table, the next step is step S2. In step S2, the address of the miss request is compared to the pre-fetched addresses in the table. If there is no match between the miss address and any of the pre-fetch addresses which have the active flag, then the next step is step S3.

If it is determined that there is an entry in the pre-fetch table where the miss address matches the pre-fetch address and the active flag is set, then the next step is step S4.

In step S4, the quality of service of the pre-fetch request is compared to the quality of service of the miss request. If the miss quality of service is better than the pre-fetch quality of service then the pre-fetch and miss bits are set in step S5 and the next step is step S3. In one embodiment, the quality of service is given the value 1, 2, 3, or 4 where 1 is the highest quality and 4 is the lowest quality. In that case, if the miss quality of service value is less than the pre-fetch quality of service value, then the pre-fetch and miss bits are set. In alternative embodiments the quality of service scale may have 4 as the best quality of service and 1 as the lowest quality of service. In that case, the bits are set if the miss quality of service value is higher than the pre-fetch quality of service value.

When the miss quality of service is worse than or the same as the pre-fetch quality of service then no request is made. The next step will be S6 where responses from the memory are awaited. When a response is received, the response TID is compared to the TID information in the pre-fetch engine. In particular, the response TID is compared to the pre-fetched TID and the miss TID.

If the response TID matches one of the TIDs without the P and M flags being set, the next step is S7. The transaction is allowed through and the active flag is set to the inactive state and the method returns to step S6.

If the response TID matches the miss TID with the P and M bits being set, then the next step will be step S8. This will allow the response through and clear the M bit. The cache miss is serviced here.

If the response TID matches the pre-fetch TID with P and M bits set, then the response is allowed through and the P bit is cleared. This is in step S9. Again, the cache miss is serviced here.

Step S10 follows steps S9 or step S8. In step S10, a response is awaited and the response TID is compared to the miss and pre-fetch TIDs.

If the response TID matches the miss TID and the M bit is set, then the next step is step S11. This will suppress the response and clear the active and M bits.

If the response TID matches the pre-fetch TID and the P bit is set, then the response is suppressed and the active and P bits are cleared. This is in step S12.

For any other matches, the next step is step S13 which allows the response through and clears the active bit. Step 13 is then followed by step S10.

Consider the following example. The pre-fetch register issues a pre-fetch request and makes an entry in the pre-fetch engine. The active flag is set, the pre-fetch address is0x1, the pre-fetch TID is A and the quality of service is Z.

The cache then receives a transaction which is a cache miss. This cache miss has the address 0x1 (i.e. the same as the pre-fetch request mentioned previously). The miss TID is B and the quality of service is X. An entry is thus made in the pre-fetch engine for this case. As can be seen, the miss has the same address as the pre-fetch address but the two transactions have a different quality of service. If the miss quality of service is lower than the pre-fetch quality of service, then the miss request is suppressed (and no entry is made in the table). If, on the other hand, the miss request has a higher quality of service than the pre-fetch request, then the miss request is allowed through (and an entry is made in the table). Accordingly, there will be two requests going to the memory with different quality of services. When a response is received to one or other of these requests, a check is made by comparing the response TID with the request TID. This response TID will be the same or at least include or be derived from the request TID. The subsequent response for the same address is then suppressed. Thus the first response is used and the later response is suppressed.

The cache is thus aware of the quality of service offered by the interface. Memory requests which generate a genuine miss are sent on the queue with the same quality of service as the original request.

Pre-fetches are sent via the different queues which map to a particular pre-fetch quality of service profile for the initiator which generated the genuine miss. In one embodiment, the set of quality of service profiles is configured by software during the software configuration.

There are many different examples of the quality of service profiles. For example, all pre-fetch requests may be mapped to a single quality of service level. This may or may not be the same as the genuine request. This may, for example, be a best effort request.

Figure 3:
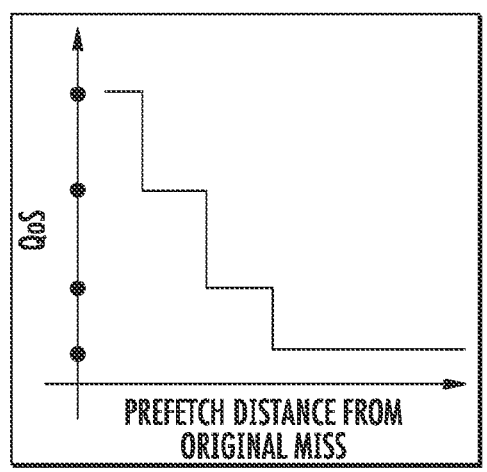
FIG. 3 graphically shows quality of service applied to pre-fetches determined by distance from original miss.

In one embodiment, the quality of service assigned to pre-fetch request may change as the pre-fetch engine progresses through the address space. For example, the further from the genuine request, the lower the quality of service. In this regard, reference is made to FIG. 3. As can be seen in FIG. 3, there are four different quality of service levels. As the pre-fetch distance from the original miss increases, the quality of service goes down. This is based on the theory of spatial locality. Addresses closer to a 'real' miss are more likely to be accessed than those further away.

It should be appreciated that pre-fetch distance is the distance between the address of an actual memory request and the address which is being pre-fetched. This may be implementation and/or application dependent. In some embodiments, this relationship may be programmable by software e.g. using control registers in the cache pre-fetch logic.

Figure 4:
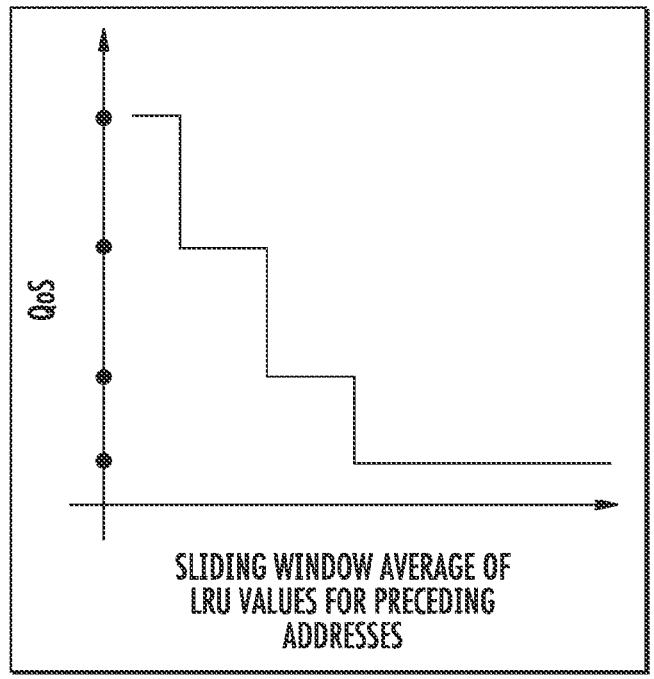
FIG. 4 graphically shows quality of service applied to pre-fetches determined by how recently used the preceding addresses are.

In another embodiment, the quality of service level applied to a prefetch is determined how recently used the preceding addresses are. For example, one embodiment is illustrated in FIG. 4. As can be seen the quality of service applied to a pre-fetch request is determined by how recently used the preceding addresses were. This uses temporal locality. These are preceding addresses for which the data is available in the cache. For example, if the preceding address is used only recently, the quality of service will be high. However, if the preceding address as been used some time ago, then the quality of service is low. This may be programmable with respect for example to access counters for each cache line.

Figure 5:
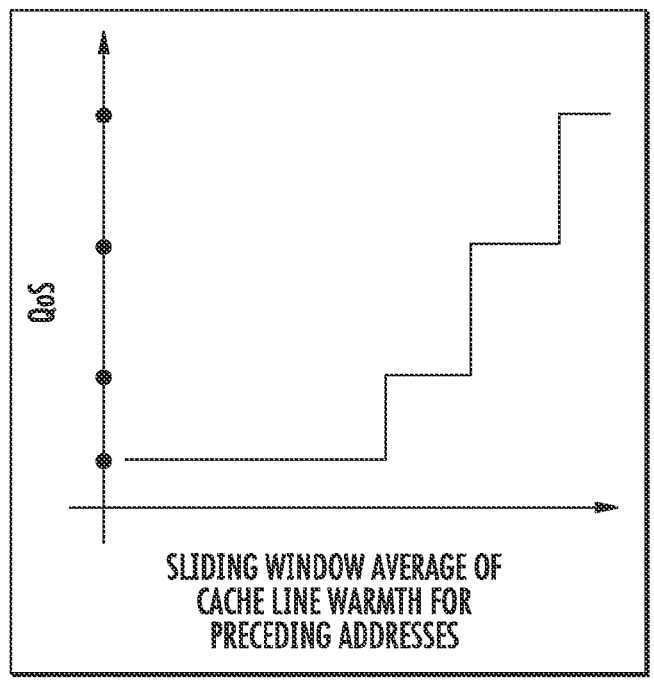
FIG. 5 graphically shows a sliding window average of cache line warmth for preceding addresses.

FIG. 5 shows an alternative where the quality of service is a sliding window average which measures how recently used a range of cache lines are. The decision on QoS is made not only with respect to the access time of a single cache line, but of access times across a range of lines. The more recently the range of cache lines have been used, the higher the quality of service. This may be based on usage of one or more of the cache lines in the region.

It should be appreciated that the memory can be any suitable type of memory.

The information used by the pre-fetch register can be stored in any suitable form, as an alternative to the table described previously.

In alternative embodiments the M and P bits may be flags or alternative indications.

Embodiments have been described in the context of a two or more dies in a package. However it should be appreciated that alternative embodiments may be provided in a single integrated circuit or used between two integrated circuits.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An integrated circuit (IC) comprising:
 a cache memory; and
 a cache memory controller coupled to said cache memory and configured to
  receive a cache miss associated with a memory location,
  issue a plurality of pre-fetch requests, each pre-fetch request having a quality of service (QoS) from a plurality QoS's, and
  determine if a pre-fetch request from the plurality of pre-fetch requests has been issued for the memory location associated with the cache miss.

2. The IC as claimed in claim 1 wherein said cache memory controller is configured to generate the respective QoS for each pre-fetch request based upon a distance between a memory location for the respective pre-fetch request and the memory location associated with the cache miss.

3. The IC as claimed in claim 1 wherein said cache memory controller is configured to generate the respective QoS for each pre-fetch request based upon an elapsed time value since use of a preceding address.

4. The IC as claimed in claim 1 wherein said cache memory controller is configured to generate the respective QoS for each pre-fetch request based upon an elapsed time value since use of a range of cache lines.

5. The IC as claimed in claim 1 wherein said cache memory controller is configured to generate the respective QoS for each pre-fetch request based upon a QoS of an associated cache miss.

6. The IC as claimed in claim 1 wherein said cache memory controller is configured to compare a QoS of the cache miss and a QoS of a pre-fetch for a same memory location.

7. The IC as claimed in claim 6 wherein said cache memory controller is configured to allow the cache miss through if said QoS of the cache miss is greater than said QoS of said pre-fetch for the same memory location.

8. The IC as claimed in claim 7 wherein said cache memory controller is configured to suppress a subsequent response associated with said same memory location.

9. The IC as claimed in claim 6 wherein said cache memory controller is configured to suppress the cache miss if said QoS of the cache miss is less than or equal to said QoS of said pre-fetch for the same memory location.

10. The IC as claimed claim 6 wherein said cache memory controller is configured to store information about at least one of said cache miss and said pre-fetch for the same memory location.

11. The IC as claimed in claim 10 wherein said information comprises at least one of a transaction identity, a memory location information, and a QoS.

12. The IC as claimed in claim 10 wherein said information comprises information indicating if a response to a pre-fetch or cache miss has been received.

13. The IC as claimed in claim 1 wherein said cache memory controller is configured to maintain a plurality of queues, each queue has an associated QoS; and wherein said cache memory controller is configured to place a pre-fetch request into a queue associated with the QoS of that request.

14. A method comprising:
receiving a cache miss;
issuing pre-fetch requests, each pre-fetch request having one of a plurality of different quality of services; and
determining if a pre-fetch request has been issued for a same memory location associated with said cache miss.

15. A method as claimed in claim 14, wherein said issuing requests comprises issuing requests with a quality of service dependent on a pre-fetch distance from a cache miss.

16. A method as claimed in claim 14, wherein said issuing requests comprises issuing requests with a quality of service dependent on a how recently a preceding addressed has been used.

17. A method as claimed in claim 14, wherein said issuing requests comprises issuing requests with a quality of service dependent on how recently a range of cache lines has been used.

18. A method as claimed in claim 14, wherein said issuing requests comprises issuing requests with a quality of service dependent on a quality of service of an associated cache miss.

19. A method as claimed in claim 14, comprising comparing a quality of service of said cache miss and a quality of service of a pre-fetch for a same memory location.

20. A method as claimed in claim 19, comprising allowing said cache miss through if said quality of service of said cache miss is higher than said quality of service of said pre-fetch for the same memory location.

21. A method as claimed in claim 20, comprising suppressing a later response associated with said same memory location.

22. A method as claimed in claim 19, comprising suppressing said cache miss if said quality of service of said cache miss is the same or lower than said quality of service of said pre-fetch for the same memory location.

23. A method as claimed in claim 22, storing information about at least one of said pre-fetch for the same memory location and said cache miss.

24. A method as claimed in claim 23, wherein said information comprises at least one of transaction identity, memory location information and quality of service.

25. A method as claimed in claim 23, wherein said information comprises information indicating if a response to a pre-fetch or cache miss has been received.

26. A method as claimed in claim 14, comprising placing a pre-fetch request into a queue associated with the quality of service of said placed request.

27. A non-transitory computer readable medium for reading by a computer and having executable instructions for execution by the computer of a method for operating an integrated circuit (IC) comprising a cache memory, and a cache memory controller coupled to the cache memory, the method comprising:
receiving a cache miss associated with a memory location;
issuing a plurality of pre-fetch requests, each pre-fetch request having a quality of service (QoS) from a plurality QoS's; and
determining if a pre-fetch request from the plurality of pre-fetch requests has been issued for the memory location associated with the cache miss.

28. The non-transitory computer readable medium as claimed in claim 27 wherein the method further comprises generating the respective QoS for each pre-fetch request based upon a distance between a memory location for the respective pre-fetch request and the memory location associated with the cache miss.

29. The non-transitory computer readable medium as claimed in claim 27 wherein the method further comprises generating the respective QoS for each pre-fetch request based upon an elapsed time value since use of a preceding address.

30. The non-transitory computer readable medium as claimed in claim 27 wherein the method further comprises generating the respective QoS for each pre-fetch request based upon an elapsed time value since use of a range of cache lines.

31. The non-transitory computer readable medium as claimed in claim 27 wherein the method further comprises generating the respective QoS for each pre-fetch request based upon a QoS of an associated cache miss.

32. The non-transitory computer readable medium as claimed in claim 27 wherein the method further comprises comparing a QoS of the cache miss and a QoS of a pre-fetch for a same memory location.

33. The non-transitory computer readable medium as claimed in claim 32 wherein the method further comprises allowing the cache miss through if the QoS of the cache miss is greater than the QoS of the pre-fetch for the same memory location.

* * * * *

UNITED STATES PATENT AND TRADEMARK OFFICE
CERTIFICATE OF CORRECTION

PATENT NO.      : 8,996,815 B2
APPLICATION NO. : 13/560491
DATED           : March 31, 2015
INVENTOR(S)     : Jones et al.

Page 1 of 1

It is certified that error appears in the above-identified patent and that said Letters Patent is hereby corrected as shown below:

In the Claims

| | |
|---|---|
| Column 8, Lines 54-55 | Delete: "plurality QoS's" <br> Insert: --plurality of QoS's-- |
| Column 9, Line 48 | Delete: "on a how" <br> Insert: --on how-- |
| Column 10, Lines 29-30 | Delete: "plurality QoS's" <br> Insert: --plurality of QoS's-- |

Signed and Sealed this
Twenty-fifth Day of August, 2015

Michelle K. Lee
*Director of the United States Patent and Trademark Office*